Oct. 5, 1948.    O. R. McINTIRE    2,450,436
MANUFACTURE OF CELLULAR THERMOPLASTIC PRODUCTS
Filed July 26, 1947
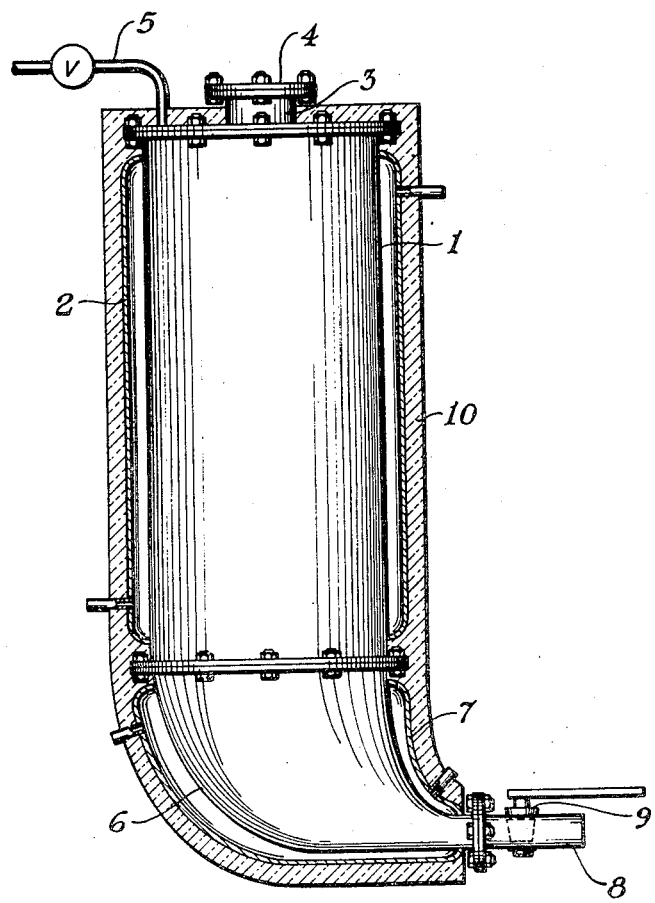
INVENTOR.
Otis Ray McIntire
BY
Griswold & Burdick
ATTORNEYS Patented Oct. 5, 1948

2,450,436

UNITED STATES PATENT OFFICE 2,450,436

MANUFACTURE OF CELLULAR THERMO-PLASTIC PRODUCTS

Otis Ray McIntire, Midland, Mich., assignor to The Dow Chemical Company, Midland, Mich., a corporation of Delaware Application July 26, 1947, Serial No. 763,989

12 Claims. (Cl. 18—48)

This invention concerns an improved method for the manufacture of cellular thermoplastic products. It pertains especially to the production of such products in the form of substantially uniform cellular masses of considerable size, e. g., of 2 inches, or greater, thickness or diameter, from the resinous benzene-soluble polymers and copolymers of monovinyl aromatic compounds having the vinyl group attached directly to a carbon atom of the aromatic nucleus, particularly styrene.

Munters et al., in United States Patent 2,023,204, have disclosed a method for the preparation of cellular polystyrene which involves heating solid polystyrene and a gas such as methyl chloride in a closed vessel under a pressure of about 30 atmospheres to a temperature above the fusion point of the polymer, i. e. to about 170° C., so as to cause absorption of a portion of the gas by the polymer and thereafter opening a bottom valve to permit flow of the polymer from the vessel. During flow from the vessel the polymer is swollen by expansion of the gas and is caused to assume the form of a somewhat elastic, non-brittle, cellular body composed for the most part of individual closed cells. The product is an excellent heat insulating material. The patent mentions a number of other gases such as air, carbon dioxide, nitrogen, etc., which, it is stated, may be used in place of methyl chloride in forming the product. Many of these gases are substantially insoluble in solid polystyrene.

Although the method of the patent may be applied on a laboratory scale, using a vessel having an outlet of $\frac{1}{16}$ inch diameter or less, for the formation of small cellular articles of ½ inch diameter or less, it has repeatedly failed when tested with larger apparatus in attempt to produce cellular articles of sizes suitable for most industrial purposes, e. g. of a size suitable for cutting into insulating panels for refrigerators. When employing a vessel having an outlet of ¼ inch diameter or larger and operating under the conditions taught in the patent, the material which flowed from the vessel swelled and collapsed with formation of an irregular-shaped mass containing a relatively few cells of non-uniform size and shape. In most instances, such irregular shaped mass was brittle at room temperature.

It is an object of this invention to provide a modification of the method of said patent which will permit the production of cellular thermoplastic articles of far greater size than are obtainable under the operating conditions of the patent. Another object is to provide an improved method for the production of the cellular products which will permit varying of the size of the closed cells of the same. Since the mechanical properties and the bulk density of the cellular product are, to a large extent, dependent on the size of its cells, the improved method permits control of these properties of the products. Other objects will be apparent from the following description of the invention.

I have found that heating of the polystyrene to its fusion temperature, i. e. about 170° C., is disadvantageous and that, when using as the agent for forming the cells a low-boiling substance which is appreciably soluble in solid polystyrene, such high temperature is not required. Instead, when using such soluble volatile agent, the temperature should be below the critical temperature of the agent, which temperature in the case of methyl chloride is approximately 143° C. I have further found that the proportion of the volatile substance which need be dissolved in the polymer in order to obtain a substantially uniform cellular product is dependent both upon the temperature to which the polymer is heated in dissolving such substance and upon the size of the outlet through which the resultant solution passes in flowing from the vessel in which it is formed.

In order to obtain a cellular product which will not collapse on standing, it is necessary, immediately after forming the cells in a thermoplastic polymeric resin, that the latter be cooled to a temperature in the vicinity of, or below, the heat distortion temperature, as determined by the method of A. S. T. M. D648–41T, of the material under treatment. In some instances, the polymer becomes rubbery as it is cooled to approach the heat distortion temperature and sufficient gas is trapped in the cells to prevent collapse during further and more gradual cooling. In such instance, immediate cooling to temperatures as much as 10° C. above the actual heat distortion temperature may be permitted. However, in other instances sufficient of the volatile substance remains dissolved in the polymer to lower its heat distortion temperature, in which case the temperature to which the polymer must immediately be cooled, after formation of the cells therein, may be below the heat distortion temperature of the polymer alone.

Since the thermoplastic polymers are, in general, poor conductors of heat, immediate cooling of the same is accomplished principally by the heat energy absorbed in the vaporization and expansion of the dissolved volatile substance to form the cells. This is particularly true when the outlet from the vessel used in forming the solution of the volatile substance and the polymer is of greater than 1/16 inch diameter, i. e. as the diameter of the outlet is increased the proportion of the heat immediately lost by radiation during swelling or expansion of the polymer becomes less. Accordingly when employing such vessel having an outlet of cross sectional area greater than that of a circle of 1/16 inch diameter, e. g. of area as great as that of a circle of 3/4 inch diameter or larger, it is necessary that sufficient of the volatile substance be dissolved in the polymer so that the heat consumed in vaporizing and expanding the same upon release of the pressure will cause immediate cooling to a temperature in the vicinity of, or below, the heat distortion temperature of the resultant cellular product. It will be appreciated that as the temperature employed in forming the solution of the volatile substance in the polymer is raised, a greater proportion of dissolved volatile substance is required to cool the material to the heat distortion temperature during formation of the cellular product.

There is an upper, as well as a lower, limit with regard to the amount of the volatile solvent for the polymer which may be used in preparing the cellular product. If too great a proportion of such solvent is used, it may, upon release of the pressure, rapidly cool the polymer and render it rigid before vaporization of the solvent is substantially complete. The solvent thus trapped in the product has the effect of lowering the heat distortion temperature of the latter and often causes it to collapse on standing. For instance, I have dissolved under pressure sufficient methyl chloride in polystyrene so that upon release of the pressure the polymer was swelled to a cellular body and was at the same time cooled to about −30° C. by vaporization and expansion of a portion of the methyl chloride. While at such low temperature, the cellular product was of good appearance, but, after standing for a half hour or more it collapsed. Apparently, the unvaporized methyl chloride which remained trapped in the product had reduced the heat distortion temperature to about room temperature or lower with resultant collapse of the cells during gradual warming of the product to approach room temperature. As the area or diameter of the outlet opening from the vessel used in dissolving a volatile agent in a polymer is increased, there is an increased tendency toward rapid cooling and setting of the outer portions of the cellular body being formed, with resultant entrapment of the unvaporized volatile agent in the inner portion of said body. Accordingly, the upper limit to the proportion of a volatile agent which may be dissolved in the polymer preparatory to formation of the cellular product, becomes less with increase in the size of the outlet from the vessel used in forming the polymer.

Other conditions, such as the kinds of volatile agent and thermoplastic polymer used in forming the cellular product and the temperature and pressure of the solution of said agent in the polymer when the pressure is released, also influence both the lower and upper limits to the proportions in which the volatile agent may satisfactorily be dissolved in the polymer; hence, said limits cannot be expressed numerically. In practice the dissolved volatile agent is employed in a proportion such as to be vaporized almost completely upon release of the pressure and such that during vaporization and expansion upon release of the pressure it not only renders the product cellular but at the same time cools it to a temperature of 85° C. or lower. The freshly prepared cellular product usually retains, in unvaporized form, not more than 5 per cent by weight of the volatile agent employed to cause formation of its cells.

Although, with a given set of starting materials, both the lower and upper limits to the proportions of a volatile agent which may be satisfactorily dissolved in the polymer shift to approach each other with increase in the size of the outlet from the vessel used in forming the solution, the rate of approach becomes less as the diameter of the outlet is increased, e. g. above 6 inches. No upper limit on the diameter of the outlet has been found. Outlets having cross sectional areas corresponding to those of circles of from 3/4 to 10 inches diameter have been used and those having areas corresponding to circles of from 1 to 4 inches diameter are preferred. I have, by the use of a dissolving tower having a valved outlet of 3 inches internal diameter, produced a substantially uniform cellular polystyrene product in the form of a log approximately 3 feet in diameter and 60 feet in length. Such log is readily cut or sawed into panels or other objects of sizes suitable for most industrial purposes.

In view of the fact that adequate rapid cooling of the cellular product during formation of the same becomes more difficult with increase in the temperature of the solution of the polymer and a volatile agent at the time when the pressure on such solution is released, this invention is restricted to release of the pressure on the solution at a time when the latter is at a temperature below 130° C., and preferably between 50° and 125° C. In some instances, the solution of the volatile agent in a thermoplastic polymer has been formed at room temperature under a pressure of several atmospheres exerted by said agent and the cellular product has been formed by releasing the pressure, e. g. by discharging the solution from the vessel in which it is formed, while at the same temperature. In all instances, the temperature, just prior to release of the pressure, is below the critical temperature of the soluble volatile agent.

The upper temperature limit of 130° C. is below the fusion temperature of ordinary solid polystyrene and also of most other thermoplastic resins. Accordingly, it is necessary to employ, as the volatile agent for forming the cellular product, a substance which, under an applied pressure of several atmospheres, is appreciably soluble, but preferably not completely soluble, in the polymer at temperatures below 130° C. Said agent is preferably one which is gaseous at room temperature and atmospheric pressure. Examples of substances which may be used as the volatile agent in forming the cellular thermoplastic products are methyl chloride, methyl ether, ethyl ether, methyl ethyl ether, and normally gaseous olefines such as ethylene, propylene, or butylene, etc. Cracked-oil gas fractions consisting for the most part of one or more of such gaseous olefines are particularly useful for the preparation of cellular polystyrene, since they may readily be dissolved in the polymer at increased pressures, e. g. of from 10 to 30 atmospheres, in amount sufficient to form the cellular product, but not in amount exceeding that which will permit formation of such product. The rate of solution of such cracked-oil gas fractions in solid polystyrene is slow at room temperature, even when applying pressure, but is satisfactorily rapid at temperatures in the order of from 70° to 125° C. Upon dissolving in a solid thermoplastic resin, a volatile agent swells the latter to a gel which is capable of flowing as a stream from the vessel in which it is formed. During flow from the vessel to a zone of relatively low pressure, the volatile agent is vaporized and causes further swelling of the polymer to form the cellular product.

In order to obtain a cellular product of uniform cell size, it is necessary that the volatile agent which is dissolved in the polymer gel remain dissolved until the gel flows from the chamber in which it is formed. If, as sometimes happens, the rate of flow of the gel within the vessel is sluggish, there may occur a pressure drop as the material flows toward the outlet such as to permit the formation of small bubbles in the gel at a time when the latter retains sufficient dissolved volatile agent to serve as a plasticizer for the polymer and render it quite rubbery. The bubbles, when formed under these circumstances, tend to grow in size as the gel flows from the vessel to a zone of lower pressure, with the result that the cellular product contains a few cells, or bubbles, far larger than the majority of its cells. This difficulty may be avoided by cooling the gel as it approaches the outlet to a temperature somewhat, e. g. from 10° to 20° C., below that of the remaining body of gel in the vessel. It may also be avoided by increasing the gas pressure on the gel within the vessel so as to cause an increase in the pressure drop at the outlet. Since the volatile agent employed in forming the gel often is at a temperature and pressure such as partially to liquefy the same, an increase in the proportion of said agent introduced into the vessel does not necessarily result in an increase in the vapor pressure within the vessel and may have a deleterious effect on the product. However, the pressure may be increased by introducing into the vessel, prior to, during, or after formation of the gel, a gas such as nitrogen, carbon-dioxide, or air, etc., which is substantially insoluble in the polymer and which is not liquefied under the conditions of operation.

I have also found that the size of the cells formed in the cellular product, and also the bulk density of the latter, may be varied at will by varying the temperature of the gel and its content of the dissolved volatile agent just prior to flow of the gel from the vessel containing the same under pressure. In general, an increase in such temperature causes a decrease in the bulk density of, and a decrease in the size of the cells in, the cellular product obtained from a gel having a given proportion of a volatile agent dissolved therein. Also, in comparative experiments wherein polystyrene gels containing the same volatile agent were at the same temperature prior to flow from the vessel used in their preparation, it was found that an increase in the proportion of said agent dissolved in the gel caused a decrease in the bulk density of, and a decrease in the size of the cells in, the product formed upon release of the pressure. By varying the operating conditions in accordance with these discoveries, I have produced, from polystyrene gels which contained the same volatile agent, cellular products having cells which, in the different products, varied in size from mere pin points barely visible to the naked eye to cells of greater than one inch diameter. It may be mentioned that the incorporation in the gels of fillers such as asbestine, or hexachlorobenzene, etc., usually has the effect of decreasing the size of the cells in the product which is formed upon release of the pressure. For different purposes, products of different cell size are preferred. The invention permits the production, from a single thermoplastic polymer, of a series of cellular products of various densities and having cells of various sizes.

The polymer gel, i. e. the solution of a volatile agent in a thermoplastic polymer, may be prepared by heating under pressure a mixture of the volatile agent and a monomeric polymerizable organic compound, e. g. styrene or methyl methacrylate, etc., so as to form the polymer in the presence of said agent and at the same time convert it directly into the desired gel. Such procedure assures uniform distribution of the volatile agent throughout the gel and may in some instances be advantageous. However, it often is more convenient to dissolve the volatile agent, under pressure, directly in the solid preformed polymer. Both procedures involve contact of the volatile agent with the polymer at superatmospheric pressure and at a temperature below the the critical temperature of said agent.

The accompanying drawing, partly in cross section, is a diagrammatic sketch showing one of the various forms of apparatus which may be employed in practicing the invention. In the drawing, the numeral 1 designates a pressure resistant vessel which is provided with a surrounding jacket 2 through which a heating or cooling fluid may be passed by way of the inlet and outlet shown. At the top, the vessel is provided with an inlet 3 having a tightly fitting cap 4 which may be removed when a resin or other solids are to be introduced into the vessel. Toward its top, the vessel 1 is also provided with a valved inlet 5 for the introduction of a gas. The lower section of vessel 1 is in the form of a goose neck 6 which is provided with a surrounding jacket 7 having an inlet and outlet for passage of a heating or cooling fluid through the same. The smaller end of the goose neck 6 connects with an outlet 8 that is provided with a valve 9 which may suitably be a plug cock, as illustrated. The numeral 10 designates a layer of heat insulating material. It may be mentioned that in employing the apparatus, the normally gaseous agent used to form a gel of a resin inside vessel 1 is advantageously introduced through the line 8 which, as just mentioned, also serves as an outlet for the resin gel from the vessel. Alternatively, the normally gaseous agent for forming a gel of the resin may be introduced through inlet 5, but the latter is usually employed for the introduction of a permanent gas, e. g. nitrogen, when using such permanent gas to increase the pressure on the gel within vessel 1.

In producing cellular polystyrene by the present method, an autoclave or other pressure-resistant vessel, having at its lower end an outlet whose opening is of a minimum cross sectional area corresponding to that of a circle of at least ¾ inch, e. g. between ¾ and 10 inches, diameter, which outlet is provided with a valve, gate, or other stopper capable of being quickly opened or closed, is preferably partially filled with ordinary polystyrene, e. g. in the form of granules, small blocks, or scraps, etc. A normally gaseous agent capable of being dissolved by the polymer is introduced at superatmospheric pressure in amount sufficient to swell the polymer and form a gel which is capable of flowing. The mixture may be heated at temperatures below the critical temperature of the agent to cause an increase in the rate at which the agent is dissolved, but heating is not in all instances required. In most instances, the solution, i. e. gel, is formed at temperatures between 70° and 125° C. As hereinbefore mentioned the amount of said agent dissolved in the polymer should be such that upon release of the pressure it is vaporized almost completely, causing further swelling to form the cellular product, and, when the gel prior to release of the pressure is at a temperature above 85° C., causes cooling of the polymer to below 85° C., e. g. between zero and 60° C.

Although the range of proportions over which the agent may be dissolved in the polymer to cause these effects is dependent upon variable conditions such as the kind of agent employed and the temperature and pressure prior to release of the pressure on the gel, suitable proportions may be calculated with sufficient accuracy. Since the principal cooling action on the part of the volatile agent is due to its heat of vaporization, it is sufficient, in making such calculation to know the heat of vaporization of said agent, the amount and specific heat of the polymer employed, the temperature to which the gel is brought before releasing the pressure, and the limits to the range of temperatures to which the polymer should be cooled by vaporization of the volatile agent upon release of the pressure. For purpose of the calculation, the limits to said range of temperatures may, in most instances be considered as —30° and 85° C., although even lower temperatures are obtainable. By calculating the amounts of a given volatile agent which must be dissolved under pressure in the polymer in order to cool the latter to —30° and 85° C., respectively, a range of proportions in which the agent may be employed is indicated. By choosing a mid-value in this range, a cellular product of good quality may be obtained. It will be understood that in order to dissolve in a polymer the amount of a volatile agent thus calculated, a somewhat larger amount of the agent must be charged into the vessel in which the solution, or gel, is to be prepared. Such calculations are of a kind usual in the art and do not require illustration.

The solution, or gel, of the volatile agent and the polymer may be formed at room temperature or above. It often is advantageous to heat the mixture under pressure at temperatures in the range of from 70° and 125° C., in order to increase the rate of solution. The time required to form the gel varies from a few hours to several days, depending on the particular starting materials and the conditions of temperature and pressure employed, but usually is in the order of from one or two days.

After forming the gel under pressure in a closed vessel, an outlet of area corresponding to that of a circle of ¾ inch diameter or larger, usually of from 1 to 4 inches diameter, which outlet is near the bottom of the vessel, is opened. The gel flows rapidly from the vessel, due to the pressure in the latter, and expands to form the cellular product. The flow from the vessel is preferably horizontal. Immediately after formation, the cellular product is usually somewhat pliable and may, if necessary, be straightened to obtain it as a beam, or log, suitable for lengthwise cutting, e. g. into slabs.

Flow from the vessel is preferably discontinued before all of the gel is discharged so as to prevent escape of a large amount of vapors. Thereafter, the vessel may be recharged and re-used to produce a further amount of the cellular material.

The following examples describe a number of ways in which the principle of the invention has been applied, but are not to be construed as limiting its scope:

EXAMPLE 1

In each of two experiments an autoclave having near the lower end, a valved outlet of one inch diameter was filled to about two-thirds of its capacity with granular polystyrene. Methyl chloride was introduced under pressure. In one of the experiments the mixture in the autoclave was heated at 170° C. under an autogenous pressure of 450 pounds per square inch for a period of about two days. In the other experiment, the mixture in the autoclave was heated for about two days at 110° C. under a pressure of about 400 pounds per square inch. In each experiment the bottom valve was then opened, whereupon a mixture of polystyrene and methyl chloride was extruded from the autoclave. The material flowing from the autoclave which was heated at 170° C. swelled to a cellular mass, of about 6 inches diameter, which collapsed with formation of an irregular-shaped body containing a relatively few cells of non-uniform size. The product was hard and brittle at room temperature. The material flowing from the autoclave heated at 100° C. swelled immediately to an elongated cellular mass of about eight inches diameter. The product was stable on standing, was non-brittle, and was composed of a great number of small thin-walled cells of substantially uniform size.

EXAMPLE 2

A cylindrical vessel of 4 inches internal diameter and 4 feet in height was charged with 7.2 pounds of granular polystyrene. A mixture of 5.7 pounds of methyl chloride and 0.6 pound of methylene chloride was introduced under pressure and the vessel was closed. The mixture within the vessel was heated at 60° C. for about two days, i. e. for a time sufficient to permit dissolving of methyl chloride and methylene chloride by the polystyrene with formation of a gel. A bottom valve of ¾ inch diameter was then opened to permit flow of a portion of the gel from the vessel. The valve was then closed and the material remaining in the vessel was heated at 80° C., for several hours. Another portion of the gel was then extruded from the vessel. Such operations were repeated at temperatures within the vessel of 90° and 100° C., respectively. The following table gives the temperature of the gel just prior to opening of the valve for each extrusion. It also describes the behavior of the gel upon flowing from the vessel.

Table I

| Test No. | Temperature, °C. | Product |
|---|---|---|
| 1 | 60 | Flow from the vessel was sluggish. The gel first swelled to a mass having large cells and thereafter collapsed to form an irregular shaped body. |
| 2 | 80 | Fairly rapid flow. Product possessed smaller cells than in Run 1. The cellular product shrunk to a slight extent. |
| 3 | 90 | Rapid flow from the vessel. The product possessed small cells. It did not shrink or collapse. |
| 4 | 100 | Very rapid flow. The product possessed fine cells. It did not shrink or collapse. |

From these results it will be seen that under otherwise similar conditions, an increase in the temperature of the gel prior to release of the pressure results in a decrease in the size of the cells formed in the product. It is also evident that in test 1, and to some extent in test 2, the gel, upon release of the pressure, was cooled and set before all of the methyl chloride and methylene chloride had vaporized, with the result that the remaining unvaporized chlorides softened and caused subsequent shrinkage or collapse of the cellular product. Tests 3 and 4 show that by raising the temperature prior to release of the pressure on the gel, these difficulties were avoided, i. e. the heat content of the gel was then sufficient to cause substantially complete vaporization of the chlorides upon release of the pressure. By employing the chlorides in smaller proportion, relative to the polystyrene, when operating at an initial gel temperature of 60° or 80° C., the difficulties experienced in tests 1 and 2 may be avoided.

EXAMPLE 3

A tower, capable of withstanding high pressures, was charged with 300 pounds of granular polystyrene, after which 100 pounds of a cracked-oil gas fraction consisting principally of propylene (i. e. containing approximately 93 per cent by weight of propylene) was added under pressure. The tower was closed and permitted to stand for two days at a temperature of 40° C. The vapor pressure within the tower was then noted and is also given. A valved outlet near the bottom of the tower was opened to permit flow of a portion of the material from the tower and was again closed. The mixture remaining in the tower was heated at 50° C. for several hours, after which another portion of the polymer gel was extruded from the tower. Such successive extrusions were repeated at temperatures within the tower of 60°, 75°, 95° and 99° C., respectively. Table II states the diameter of the valved outlet used in each extrusion, gives the diameter (or the limits to the variations in diameter) of the log of the cellular product, states the bulk density, as pounds per cubic foot, of the cellular product, and describes the product.

cracked-oil gas fraction containing approximately 87 per cent by weight of normal butylenes, together with minor amounts of other hydrocarbons, e. g. butanes, butadiene, etc., having four carbon atoms in the molecule, was introduced under pressure. The tower was closed and heated at a temperature of 110° C. for two days. Throughout this period of heating the gas pressure inside the tower was 265 pounds per square inch, gauge. An outlet, of 3.25 inches diameter, situated near the lower end of the tower was then repeatedly opened and closed to permit extrusion of the polystyrene gel from the tower in amounts which, upon expansion due to vaporization of the dissolved aliphatic hydrocarbons formed logs of cellular polystyrene which were of 20 inches diameter and approximately 20 feet in length. Each log was composed of a mass of thin-walled fine closed cells of substantially uniform size. The logs of cellular polystyrene each possessed a bulk density of 0.8 pound per cubic foot.

The method herein disclosed may be applied in producing uniform cellular products from other thermoplastic resins such as the solid polymers of para-chlorostyrene, meta-chlorostyrene, ortho-methylstyrene, meta-methylstyrene, meta-ethylstyrene, ortho-ethylstyrene, para-isopropylstyrene, methyl-methacrylate and vinyl acetate, and from solid thermoplastic copolymers such as those of styrene and methyl-methacrylate, or of vinyl acetate and vinyl chloride, etc. In all instances, it is important that the aforementioned limitations with regard to the proportion of a volatile agent employed in forming a gel of the resin and the temperature of the gel prior to release of the pressure be observed.

This application is a continuation-in-part of my copending application, Serial No. 545,891, filed July 20, 1944, now abandoned.

Other modes of applying the principle of the invention may be employed instead of those explained, change being made as regards the method herein disclosed provided the step or steps stated by any of the following claims or the equivalent of such stated step or steps be employed.

I therefore particularly point out and distinctly claim as my invention:

*Table II*

| Test No. | Tower Conditions | | | Cellular Product | | |
|---|---|---|---|---|---|---|
| | Temp., °C. | Pressure, lbs./sq. in. | Diameter of Outlet, inches | Diameter, inches | Bulk Density, lbs./cu. ft. | Description |
| 1 | 40 | 200 | 3.25 | 8 | 7.7 | Coarse, but uniform cells. |
| 2 | 50 | 250 | 3.25 | 6–9 | 4.8 | Somewhat smaller, uniform cells. |
| 3 | 60 | 300 | 2.5 | 11 | 3.08 | Small uniform cells. |
| 4 | 75 | 395 | 3.25 | 18–20 | 2.9 | Uniform cells are finer than in Test 3. |
| 5 | 95 | 410 | 3.25 | 6–9 | 3.3 | Product contained large bubbles and holes. |
| 6 | 99 | 435 | 3.25 | 8–12 | 2.0 | Product contained large bubbles and holes. |

The hydrocarbon mixture employed as a volatile agent in these tests possesses a critical temperature of about 90° C. Tests 5 and 6, when compared with tests 1–4, illustrate the importance of having the gel at a temperature below the critical temperature of the volatile agent when the pressure is released, i. e. when the gel flows from the tower.

EXAMPLE 4

A tower, capable of withstanding high pressures, was charged with 300 pounds of granular polystyrene. Approximately 130 pounds of a 1. In a method for the production of a substantially uniform solid cellular thermoplastic article which is composed of individual closed cells having thin walls of a solid thermoplastic polymer, the smallest linear dimension of which article is at least 2 inches, the steps which consist in charging a vessel with a solid thermoplastic polymer, also introducing into the vessel a normally gaseous agent capable of being dissolved by the polymer so that the polymer and the normally gaseous agent are in contact with one another, subjecting the mixture to superatmospheric pressure while at a temperature within the range of from room temperature to below the critical temperature of said agent for a time sufficient to form a gel of the polymer, which gel is capable of flowing, the normally gaseous agent having been introduced and dissolved in the polymer gel in amount such as to be vaporized substantially completely upon release of the pressure with resultant swelling and cooling, due principally to the heat of vaporization of said agent, of the polymer to form a cellular mass which, when formed, is at a temperature within the range of between −30° C. and ten degrees above the heat distortion temperature of the polymer, and opening an outlet, having an aperture of minimum cross sectional area corresponding to that of a circle of at least three-fourths inch diameter, near the bottom of the vessel so as to cause the gel to flow from the vessel and form the cellular product.

2. The method, as described in claim 1, wherein the polymer is one selected from the class consisting of the thermoplastic polymers of monovinyl-aromatic compounds and thermoplastic copolymers of monovinyl-aromatic compounds.

3. The method, as described in claim 1, wherein the normally gaseous agent contains as its principal component at least one olefine having from three to four carbon atoms in the molecule.

4. The method, as described in claim 1, wherein the polymer is one selected from the class consisting of the thermoplastic polymers of monovinyl-aromatic compounds and thermoplastic copolymers of monovinyl-aromatic compounds, and the normally gaseous agent contains as its principal component at least one olefine having from three to four carbon atoms in the molecule.

5. The method, as described in claim 1, wherein the polymer is polystyrene.

6. The method, as described in claim 1, wherein the polymer is polystyrene and the normally gaseous agent contains as its principal component at least one olefine having from three to four carbon atoms in the molecule.

7. In a method for the production of a substantially uniform solid cellular thermoplastic article which is composed of individual closed cells having thin walls of a solid thermoplastic polymer, the smallest linear dimension of which article is at least 2 inches, the steps which consist in charging a vessel with a solid thermoplastic polymer, also introducing into the vessel a normally gaseous agent capable of being dissolved by the polymer so that the polymer and the normally gaseous agent are in contact with one another, subjecting the mixture to superatmospheric pressure while at a temperature within the range of from room temperature to below the critical temperature of said agent for a time sufficient to form a gel of the polymer, which gel is capable of flowing, the normally gaseous agent having been introduced and dissolved in the polymer gel in amount such as to be vaporized substantially completely upon release of the pressure with resultant swelling and cooling, due principally to the heat of vaporization of said agent, of the polymer to form a cellular mass which, when formed, is at a temperature within the range of from −30° C. to 85° C., and opening an outlet, having an aperture of minimum cross sectional area corresponding to that of a circle of between three-fourths inch and 10 inches diameter, near the bottom of the vessel so as to cause the gel to be extruded from the vessel and form the cellular product.

8. The method, as described in claim 7, wherein the polymer is one selected from the class consisting of thermoplastic polymers and copolymers of monovinyl-aromatic compounds.

9. The method, as described in claim 7, wherein the normally gaseous agent contains as its principal component at least one olefine having from three to four carbon atoms in the molecule.

10. The method, as described in claim 7, wherein the polymer is one selected from the class consisting of the thermoplastic polymers of monovinyl-aromatic compounds and thermoplastic copolymers of monovinyl-aromatic compounds, and the normally gaseous agent is composed for the most part of at least one olefine having from three to four carbon atoms in the molecule.

11. The method, as described in claim 7, wherein the polymer is polystyrene.

12. The method, as described in claim 7, wherein the polymer is polystyrene and the normally gaseous agent contains as its pricipal component at least one olefine having from three to four carbon atoms in the molecule.

OTIS RAY McINTIRE.

No references cited.